April 15, 1969  E. MEIER  3,438,466

BRAKE-HOUSING ASSEMBLY FOR DISK BRAKES

Filed Aug. 30, 1967

ERNST MEIER
INVENTOR.

BY

Karl J. Ross
ATTORNEY

ERNST MEIER
INVENTOR.

BY Karl F. Ross

ATTORNEY

United States Patent Office 3,438,466
Patented Apr. 15, 1969

3,438,466
BRAKE-HOUSING ASSEMBLY FOR DISK BRAKES
Ernst Meier, Frankfurt am Main-Sindlingen, Germany, assignor to Alfred Teves Maschinen- und Armaturenfabrik KG, Frankfurt am Main, Germany, a corporation of Germany
Filed Aug. 30, 1967, Ser. No. 664,340
Claims priority, application Germany, Sept. 14, 1966, T 32,053
Int. Cl. F16d 55/00
U.S. Cl. 188—73                                10 Claims

ABSTRACT OF THE DISCLOSURE

The invention relates to a disk-brake assembly whose aluminum or aluminum-alloy yoke is disposed along the periphery of the brake disk and has, integrally formed at least on the cantilevered yoke half where one yoke half is affixed to the axial housing or another support, at least one reinforcing rib extending across the yoke half over the greater part of the width thereof in the direction of rotation of the disk. The rib receives a tension bolt whose head bears upon one end of the rib and whose threaded extremity either is screwed into the rib at the other end or is locked thereagainst by a nut. The ribs and bolts are tangential to the disk or to circles concentric therewith and lie in planes parallel to the braking faces of the disk.

---

My present invention relates to disk-brake installations of the type in which a brake yoke is disposed along the periphery of a brake disk and supports an actuating mechanism adapted to apply a pair of brakeshoes to the opposite faces of the disk; more particularly, the invention relates to an improved housing or support for brakes of this character.

Disk-brake arrangements have become increasingly popular in motor-vehicle applications as a consequence of higher braking efficiency, fast response and low fluid requirements. Such brake installations generally comprise a brake disk having a pair of annular braking faces on opposite sides of the disk lying in planes transverse to the axis of rotation of the disk which is affixed to a vehicle wheel via a wheel hub or the wheel axle; a brake yoke extends along a sector of the periphery of the disk and is provided with respective lobes overlying the respective braking faces and carrying brakeshoes which are applied to the disk by hydraulic or mechanical actuating means. These installations can be of various types, dependent upon whether the yoke of the brake is fixed or movable. For example, so-called "floating-yoke" brakes having a yoke which, while tied to a relatively fixed portion of the vehicle such as the axle housing, is axially shiftable relatively to the disk and has a hydraulic cylinder in one lobe. When the piston of this cylinder applies one brakeshoe directly against the disk, the reaction force draws the other brakeshoe against the disk via the yoke which here acts as a force-transmitting member. In another common arrangement, a "fixed-yoke" brake is provided in which at least one lobe is rigidly secured to the axle housing or another part of the vehicle body with respect to which the brake disk is rotatable. In this case, a pair of hydraulic cylinders (hereinafter referred to as wheel-brake cylinders) is provided, each piston urging a respective brakeshoe directly against the disk. Still other disk-brake assemblies make use of axially shiftable brake disks which are splined to the axle or swinging yokes.

When the disk-brake assembly is to be mounted at least in part in the dished or concave portion of the wheel disk, it has been found to be desirable to dimension the brake yoke so as to minimize its spatial requirements and impart to the unit such shape as to enable it to fit readily within the wheel disk. These considerations, however, are to be viewed in light of the fact that the yoke must be capable of withstanding the high stresses applied by the braking action and should have a minimal mass. This latter factor arises from the requirement that the unsprung weight of the vehicle, i.e. the weight of the vehicle chassis which is not resiliently supported upon the wheels, should be kept as low as possible for smoothness of ride and minimum vibrational transmission to the body. Thus it is known to use light metals, i.e. aluminum and aluminum alloys, for the yokes of these brakes, although this expedient has not been fully acceptable because it increases the susceptibility of the brake support or housing to bending and tensile stresses when brakes are applied. This is especially the case when the brake yoke is composed of lobes which are bridged by integral webs, bolts or the like extending perpendicularly to the brake disk and parallel to the axis thereof. In these arrangements, one lobe of the brake—hereinafter referred to as the "flange half"—is affixed to the axial housing via the flange and eyelet cast or forged therein. The other lobe, called the "cover half" because it is received and enclosed by the wheel disk and is exposed when the wheel is removed, is cantilevered upon the flange half. In addition to the bending stresses arising from the cantilevered construction and the fact that braking pressure reacts against the yoke and tends to twist the latter about its fastening members, tensile stress develops in the plane of the brake disk which, of course, tends to entrain the shoes frictionally engaging it in the direction of rotation.

It is, therefore, the principal object of the present invention to provide an improved brake assembly, and especially a yoke for a disk-brake assembly wherein the aforementioned disadvantages can be avoided and greater strength can be attained in a relatively small volume and with a relatively small mass of the brake yoke.

This object and others which will become apparent hereinafter are attainable as a result of my surprising discovery that it is possible to reinforce greatly the yoke against bending stresses which might otherwise tend to distort it by providing at least one rib in at least the cantilevered yoke half which lies in a plane parallel to the plane of the disk and perpendicular to the axis of rotation thereof, this rib extending tangentially across a major part of the wheel of the yoke half in its direction of rotation and lying generally tangentially to a circle centered upon the axis of rotation of the disk. Preferably, the rib, or at least one of the ribs, is tangential to a circle of this character whose diameter is equal to the outer diameter of the disk so that the rib can be considered tangential to the disk. Each of the ribs, according to the present invention, which may be forged or cast integrally with the yoke half or the members constituting same, is provided with at least one passage receiving at least one tension element whose tensile and transverse strengths are greater than that of the casting or forging constituting the yoke, the tensioning elements preferably being constituted as bolts having one end threadedly anchored to the yoke half on one side of an axial median plane through the assembly, usually the common plane of the axis of rotation of the disk and the respective wheel-brake cylinder axis, while the other end has a head or shoulder bearing upon the yoke half on the opposite side of this latter plane. When the term "at least one bolt" is used to refer to the tension element extending through the ribs, it will be understood that a plurality of individual passages can be provided in a single rib for receiving respective bolts or a plurality of bolts can pass through a single passage, all within the precepts of the present invention. In single-unit or monolithic yokes in which the flange and cover halves are integrally formed with one another, it is a common practice to drill the cylinder bores from one side of the yoke and then close the cylinder bore with a cap or plug. I have found that a sharply increased stiffness and resistance to bending stress develops when the cover is recessed in the respective yoke half and has a throughgoing passage aligned with the rib on either side and preferably passing diametrically through this cover plate for receiving the tension bolt. Preferably, the cover plate is formed with a rib portion whose diameter is equal to the rib portions adjoining it and which bears at its end against the adjacent rib portion of the housing to form a substantially continuous rib with the interfaces being retained together with force by the tension bolt which is tightened with a torque wrench to a predetermined minimum tension. According to this invention, the bolt retains the cover plate in place without canting so that, when the bolt is tightened, a maximum resistance to distortion is provided by the inserted cover plate. In prior-art structures, such canting was commonplace and it was necessary to make the cover plate thicker than would otherwise be desirable so that a decrease in the mass of the unit is achieved by the present arrangement. The bolt can be anchored in the rib or yoke half by providing the latter with an internal thread or an internally threaded insert rigid with the rib while the alternative of using a nut in engagement with a projecting threaded extremity of the bolt is also possible.

The above and other objects, features and advantages of the present invention will become more readily apparent from the following description, reference being made to the accompanying drawing in which.

Figure 2:
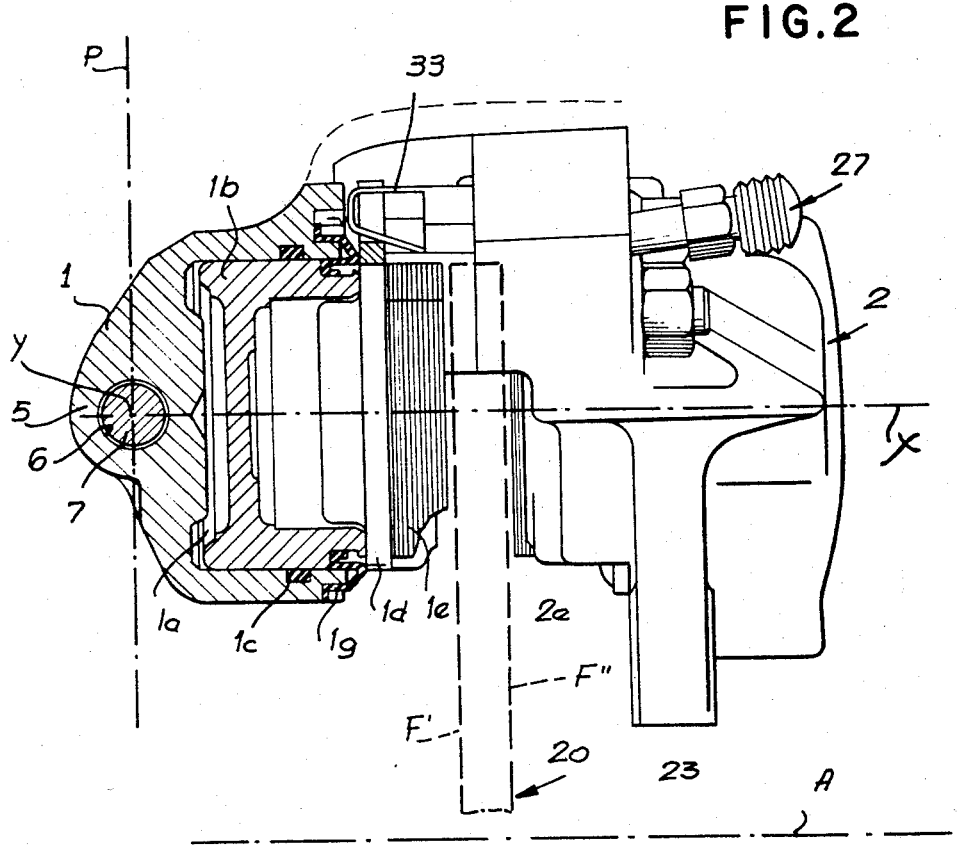
FIG. 2 is a side-elevational view, partly in section along the line II—II of FIG. 1 of the yoke of the disk brake, the disk again being represented in dot-dash lines.
Figure 3:
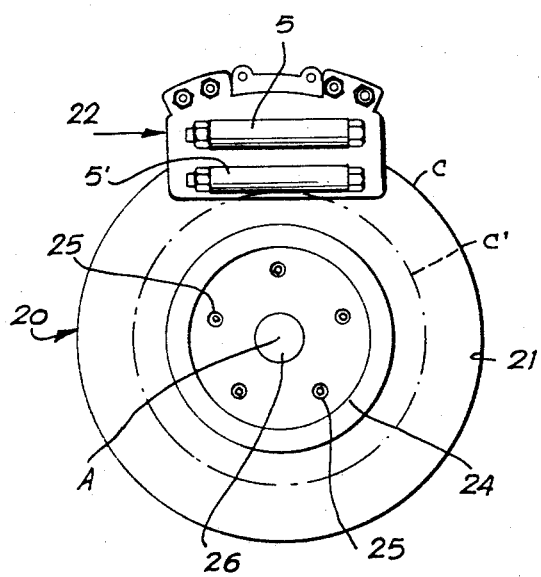
FIG. 3 is a rear-elevational view of the disk-brake assembly, drawn to a reduced scale.

Referring first to FIG. 3 in which I show a disk-brake assembly using the system of the present invention as applied to vehicle brakes, it will be seen that the system basically comprises a disk 20 whose flat peripheral portion 21 is overlain by a respective lobe of a disk-brake yoke generally designated 22 and comprising yoke halves 1 and 2, the latter being provided with a flange 23 for affixing the yoke to an axial housing. The hub 24 of the disk 20 has the usual screws 25 to which the wheel is attached while a shaft 26 extending through the axle housing (not shown) carries the disk 20. The yoke 22 is thus disposed along the periphery of the disk which has its center of rotation at the axis A of the shaft 26 while the outer portion 21 of the disk lies in a plane perpendicular to the axis A as diagrammatically represented in FIG. 2. The reinforcing ribs (a pair being shown here at 5 and 5') thus lie in planes, e.g. the plane P (FIG. 2) parallel to the braking faces F' and F" of the disk 20 and are tangential to respective circles C and C' centered upon the axis A. Preferably at least one of the ribs 5 and 5' integrally formed in the housing, is tangential to the outer periphery of the disk 20 as represented by the circle C. In the further description, made with reference to FIGS. 1 and 2, only a single reinforcing rib has been shown and discussed.

Figure 1:
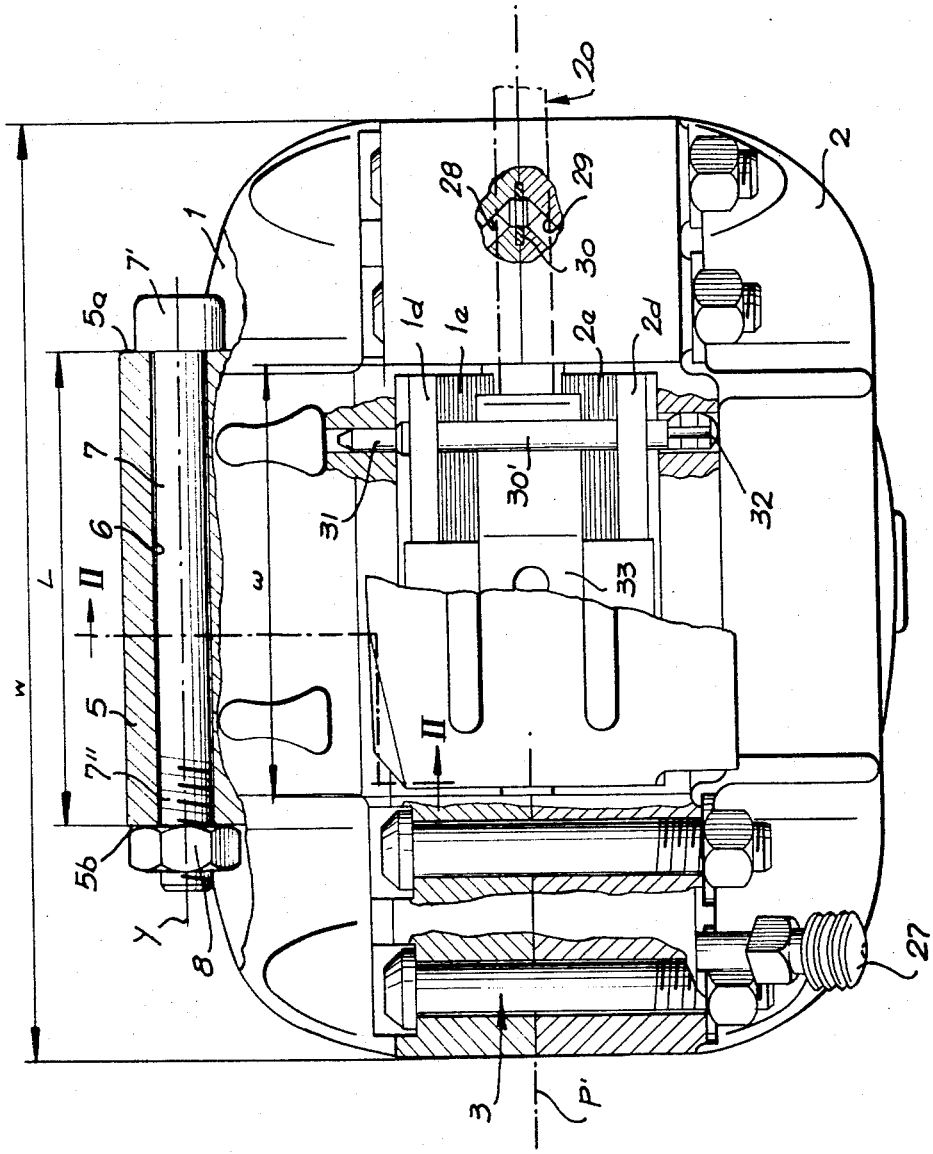
FIG. 1 is a plan view, partly broken away, of a disk brake embodying the present invention, the disk being shown diagrammatically.

The brake housing or yoke of FIGS. 1 and 2 comprises a "flange half" 2 which is fixed to the axle housing by the flange 23 inwardly of the wheel disk of the vehicle wheel which, in turn, is attached to the hub 24 of the disk via a bolt 25 welded to or passing through this hub. The outermost portion of the brake yoke, namely the yoke half 1, is cantilevered on the yoke half 2 and may be referred to as the "cover half" of the brake yoke since it is enclosed by the dished wheel disk and is exposed upon removal of the wheel. Bolts 3 connect the two yoke halves 1 and 2 along their interfacial plane P' which also forms the median plane of the disk and extends perpendicularly to the axis A. Each of the yoke halves 1 and 2 is formed with a respective cylinder bore, one of which is shown at 1a which receives a wheel-brake piston 1b while fluid escape is prevented via an annular seal 1c received in the wall of the cylinder bore 1a. The pistons (e.g. 1b) bear upon the respective backing plates 1d, 2d of the brakeshoes, whose lines are represented at 1e and 2e, confronting the faces F' and F" of the disk 20. Sealing cuffs represented at 1g connect the cylinders with the respective pistons to prevent entry of contaminants into the cylinder bore.

An inlet fitting 27 delivers hydraulic fluid to the cylinders on both sides of the disk 20 for operation of the brakeshoes as described and illustrated in greater detail in my copending application Ser. No. 589,000, filed Oct. 24, 1966. As described in that application, the working chambers of the two cylinders are connected by a pair of downwardly extending passages 28 and 29 registering with one another at the junction P' of the yoke halves at which a sealing washer 30 (FIG. 1) is provided. Guide pins 30' slidably pass through the eyelets of the backing plates 1d and 2d of the brakeshoes and have extremities 31 and 32 received in the yoke halves 1 and 2 so as to be slidable relatively to at least one of them for thermal expansion and contraction movements. In addition, a spring clip 33 of conventional configuration retains the brakeshoes in place.

According to the present invention the yoke half 1, remote from the attachment flange 23 and cantilevered on yoke half 2 so that the yoke half 1 (composed of aluminum or aluminum alloy) may be received in the dished wheel disk of an automotive vehicle wheel, is provided with a rib 5 integrally forged or cast in the unitary yoke half 1. The reinforcing rib 5 which extends parallel to the faces F' and F" of the disk and, consequently, transversely to the axis X of the wheel-brake cylinders, has a length L equal at least to a major fraction of the overall width W of the yoke half in the direction of movement of the disk.

Thus, the reinforcing ribs increase the moment of resistance of the brake housing to bending. The reinforcing rib 5 (or 5' as previously described) is provided with a throughgoing bore 6 whose axis Y lies in a plane P parallel to the braking faces F' and F" of the disk 20 and is thus perpendicular to the axis X of the wheel-brake cylinders. The bore 6 receives a tension element in the form of a bolt 7 (e.g. of steel) whose tensile strength exceeds that of the yoke half and which is tensioned to exert compression thereagainst in the plane P and along the axis Y by a head 7' which bears against one face 5a of the rib 5 while the threaded portion 7" of the bolt extends beyond flank 5b and bears thereagainst via a nut 8 tightened by a torque wrench to a pretension of the bolt such that the tension generated upon application of the brake in the outrigger or cantilevered part of the yoke balances the precompression applied by the bolt thereto. Under these circumstances, the only stress applied to the housing is the balanced force in the direction of bolts 3 and axis X developed by the reaction forces of brake application.

It will be understood that a single rib as shown at 5 can be provided with a number of bolts, that additional ribs may be provided with or without bolts and that the tension elements may be disposed in a common bore or, as illustrated, in individual bores. It is important, in accordance with the principles of the present invention that the ribs and tension bolts have a length which may exceed the diameter of the wheel cylinder and is equal to the width w of the brakeshoes (FIG. 1) and that the bolts and ribs extend along tangents to circles concentric with the disk 20 (at least one being preferably of the diameter thereof) as described in connection with FIG. 3.

Figure 4:
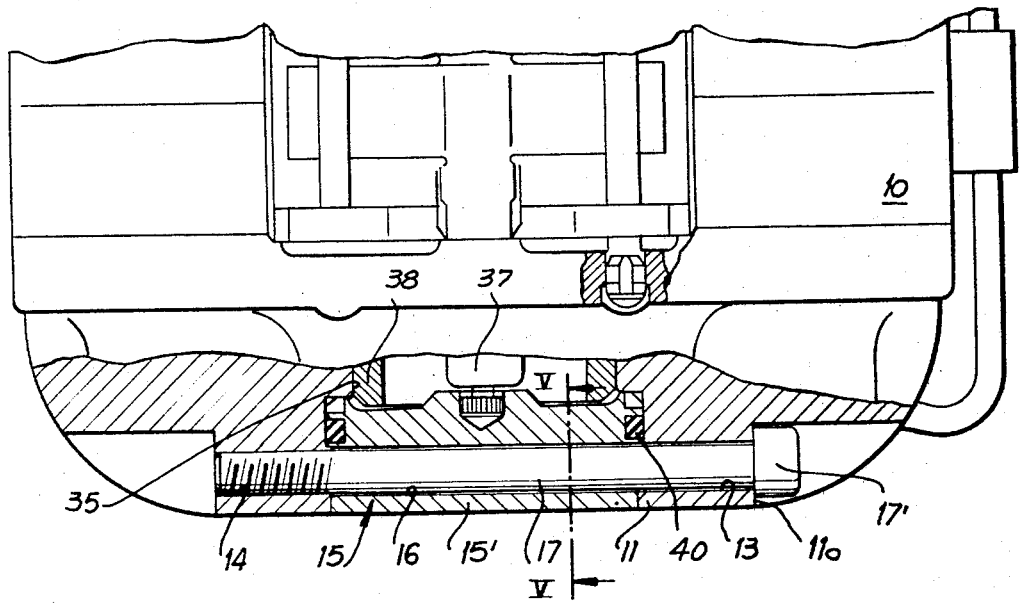
FIG. 4 is a fragmentary plan view, partly broken away, of another disk brake yoke.
Figure 5:
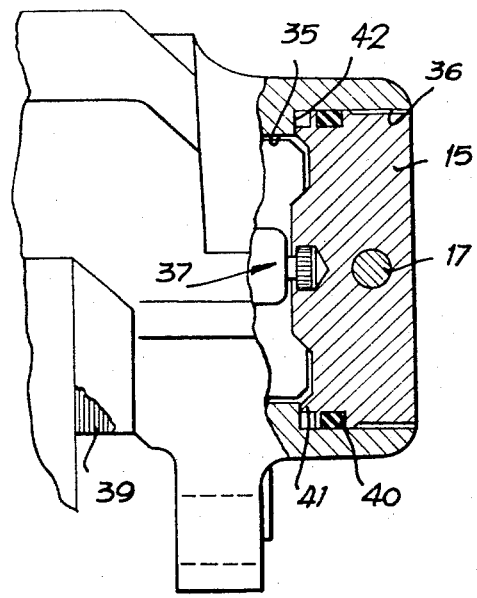
FIG. 5 is a side-elevational view, partly in cross-section, along the line V—V of FIG. 4.

While the brake support of FIGS. 1–3 was a two-part housing, it is also convenient to constitute the brake yoke as a unitary member so that the lobes thereof are integrally cast, forged or machined. In this case, it is the common practice to form the cylinder bore 35 from one side of the yoke and to close this side with a cover plate 15 received in a recess 36 coaxial with the bore 35. Automatic adjustment means 37 for resetting the rest position of the pistons 38 upon wear of the respective brakeshoes (e.g. 39) is mounted in the rear wall of the cylinder bore as formed by the plate 15. A seal 40 prevents escape of fluid from the system while an axially extending positioning lip 41 engages a shoulder 42 of the yoke 10. In this case, the rib 11 registers and is coaxial with the reinforced portion 15′ of the cover plate 15 and has a bore 13 registering with the throughgoing bore 16 of cover plate 15. In the registering positions, a tension bolt 17 is inserted through the rib 11 and the plate 15 until its head 17′ bears upon the flank 11a of this rib. The remote end of the bore 13 is formed with an internal thread 14 threadedly engaged by the bolt 17 which is thus anchored to the yoke to apply precompression thereto. In this case also, the bolt is tightened by a torque wrench as previously described. Again, the precompression balances the tensile stress applied during brake actuation so that a binding of the yoke is impossible and there is little deformation of the brake support. In operation, of course, the brake of FIGS. 1–3 and that of FIGS. 4 and 5 are similar to the system described in application Ser. No. 589,000 (now U.S. Patent No. 3,396,824 of Aug. 13, 1968). The system of FIGS. 4 and 5 has, however, the additional advantage that the bolt 17 ensures proper positioning of the cover plate 15 in the recess 36 and thus greater sealing of the cylinder bore 35. Further, the bolt resists the high axial compression force applied to the plate 15 by the reaction of the hydraulic fluid thereagainst.

I claim:
1. In a disk-brake assembly having a brake yoke disposed along and partly receiving the periphery of a brake disk rotatable about an axis, and wherein the brake yoke has a pair of brakeshoes displaceable transverly to the disk into frictional engagement with braking faces thereof, the improvement wherein said yoke has a supported lobe and a cantilevered lobe constituted of a unitary yoke half formed monolithically of metal and provided with a cylinder bore adapted to receive a piston for displacement of a respective one of said brakeshoes, said yoke half of said cantilevered lobe being unitarily formed with at least one continuous reinforcing rib in a plane parallel to the braking faces of said disk and generally tangential to a circle centered upon the axis of rotation thereof, said rib having a length exceeding the diameter of said cylinder, and at least one tension element extending through said rib and bearing against said yoke to apply compression thereto parallel to the tension element.

2. The improvement defined in claim 1 wherein a plurality of generally parallel bolts form respective tension elements.

3. The improvement defined in claim 1 wherein said yoke is provided with a plurality of said ribs each receiving a respective tension element.

4. The improvement defined in claim 1 wherein said tension element is a bolt having a threaded extremity extending through a corresponding end of said rib, a nut being threaded upon said extremity and bearing upon said end of said rib.

5. The improvement defined in claim 4 wherein said bolt has at its other extremity a head bearing upon said rib.

6. In a disk-brake assembly having a brake yoke disposed along and partly receiving the periphery of a brake disk rotatable about an axis, and wherein the brake yoke has a pair of brakeshoes displaceable transversely to the disk into frictional engagement with braking faces thereof, the improvement wherein said yoke is provided with at least one reinforcing rib in a plane parallel to the braking faces of said disk and generally tangential to a circle centered upon the axis of rotation thereof, and at least one tension element extending through said rib and bearing against said yoke to apply compression thereto parallel to the tension element, and wherein said yoke is provided with a cylinder bore having a cover plate received in said yoke and closing said bore, said tension element extending through said cover plate.

7. The improvement defined in claim 6 wherein said tension element runs generally tangential to said disk.

8. The improvement defined in claim 6 wherein said yoke is composed of a pair of aluminum yoke halves interconnected by bolts extending perpendicularly to said disk and parallel to the axis thereof, one of said yoke halves being mounted upon a support fixed with respect to said axis, the other of said yoke halves being provided with said rib.

9. The improvement defined in claim 6 wherein said tension element is a bolt having a threaded extremity and said yoke has an internal thread engaging said extremity of said bolt.

10. The improvement defined in claim 9 wherein the other extremity of said bolt is formed with a head bearing against a corresponding end of said rib.

References Cited
UNITED STATES PATENTS

| | | | |
|---|---|---|---|
| 2,986,238 | 5/1961 | Eaton | 188—251 |
| 3,179,209 | 4/1965 | Lucien et al. | 188—251 X |
| 3,195,687 | 7/1965 | Thirion | 188—73 |
| 3,220,513 | 11/1965 | Hodkinson | 188—73 |
| 3,312,317 | 4/1967 | Hawley et al. | 188—73 X |

GEORGE E. A. HALVOSA, *Primary Examiner.*